United States Patent [19]
Baughn et al.

[11] Patent Number: 5,843,315
[45] Date of Patent: Dec. 1, 1998

[54] SYSTEM AND METHOD FOR RECOVERING AGGREGATE FINE SIZE PARTICLES

[75] Inventors: Bruce E. Baughn, Winston-Salem, N.C.; Dennis M. McClelland, Warrenton, Va.

[73] Assignee: Vulcan Materials Company, Winston Salem, N.C.

[21] Appl. No.: 644,165

[22] Filed: May 10, 1996

[51] Int. Cl.[6] .................................................. B01D 21/01
[52] U.S. Cl. .............................. 210/723; 209/5; 210/710; 210/713; 210/768; 210/787; 210/804; 210/806
[58] Field of Search .................................. 210/702, 710, 210/712, 713, 768, 787, 790, 804, 805, 806, 723; 209/5

[56] References Cited

U.S. PATENT DOCUMENTS

| | | |
|---|---|---|
| 3,385,432 | 5/1968 | Overall et al. . |
| 3,424,308 | 1/1969 | Fenske . |
| 3,807,558 | 4/1974 | Hamm ..................................... 209/155 |
| 4,175,035 | 11/1979 | Moyer, Jr. . |
| 4,222,529 | 9/1980 | Long ......................................... 209/17 |
| 4,575,421 | 3/1986 | Derrick et al. . |
| 4,737,271 | 4/1988 | Childs ..................................... 210/788 |
| 4,819,809 | 4/1989 | Derrick . |
| 4,838,434 | 6/1989 | Miller et al. ............................. 210/788 |
| 4,840,736 | 6/1989 | Sander et al. . |
| 4,857,176 | 8/1989 | Derrick et al. . |
| 4,879,048 | 11/1989 | Kreyenberg . |
| 4,882,054 | 11/1989 | Derrick et al. . |
| 5,169,004 | 12/1992 | Pos . |
| 5,366,639 | 11/1994 | Jones et al. ............................. 210/787 |

OTHER PUBLICATIONS

Phoenix Process Equipment Co., High Rate Thickener product brochure HF–100–03–WPC.
Phoenix Process Equipment Co., Belt Filter Press product brochure BP–100–02–WPC.
Phoenix Process Equipment Co., High–Rate Thickener product brochure.
Phoenix Process Equipment Co., Belt Press product brochure.
Garrett, "Owl Rock says goodbye to slurry holding ponds," reprinted from Pit & Quarry (Sep. 1991).
Derrick Corp., Hi "G" Dryer product brochure, Bulletin 3000.
Derrick Corp., Round Desilter product brochure, Bulletin 3046.
Derrick Corp., 4 Inch Hydrocyclone product brochure, Bulletin 3411.
Derrick Corp., Inline Desilters product brochure, Bulletin 3045.
Derrick Corp., Derrick Pyramid Screens product brochure.
Stranco, Inc., PolyBlend Polymer Preparation and Feed System product brochure, 1988.

(List continued on next page.)

*Primary Examiner*—Jay H. Woo
*Assistant Examiner*—Betsey J. Morrison
*Attorney, Agent, or Firm*—Burns, Doane, Swecker & Mathis, L.L.P.

[57] ABSTRACT

Provided is a novel method and system for recovering aggregate fine size particles from a carrying medium. The method comprises:

(a) introducing a feed containing particles to a sand screw, and separating the particles into separate groups of large and fine particles, the fine particles being present in a fine particle stream;

(b) introducing the fine particle stream from the sand screw to one or more hydraulic centrifugal separators which overflow a fine particle stream and discharge a coarse particle stream;

(c) introducing the overflow fine particle stream from the one or more hydraulic centrifugal separators to a thickening tank and removing precipitated material as an underflow stream from a lower portion of the thickening tank; and (d) introducing the underflow from the thickening tank to a filtering unit.

19 Claims, 1 Drawing Sheet

OTHER PUBLICATIONS

Wood et al, "Economical and Effective Recovery of Effluent Fines from Sand Screws Using Polymer Flocculants—Case Studies," Neutron Products, Inc., pp. 174–194.

Branning et al, "Factors Affecting the Dewatering of Coal Refuse Slurries Using Twin Belt Continuous Filters," presented at Coal Prep 86, Lexington, KY, Apr. 28–30, 1986.

Mt. Fury Co., Dosage Supervisor 1 Polymer Dosage Controller Installation, Operation and Maintenance Instructions.

Prokopy, "Markets, Cost Savings Created Using By–Product Fines," Rock Products, Apr. 1995, pp. 21–22.

"A fine solution: Dewatering process creates cost savings, markets for by–products," Aggregate Views, vol. 2, No. 3, Fall 1994, pp. 4–5.

Mt. Fury Co., Inc., Mt. Fury Profiler product brochure.

Mt. Fury Co., Inc., Mt. Fury Process Control System product brochure.

Wedgewood Technologies, Wedgewood Optical Sensors product brochure.

SYSTEM AND METHOD FOR RECOVERING AGGREGATE FINE SIZE PARTICLES

BACKGROUND OF THE INVENTION

1. Field of the Invention

The present invention relates to a method for recovering aggregate fine size particles from a carrying medium. The present invention also relates to a system for recovering aggregate fine size particles from a carrying medium. The method and system have particular applicability in the mineral aggregates industry.

2. Description of the Related Art

Washing out fines in aggregates has presented many problems, and the economic removal and recovery or proper disposal thereof has posed one of the greatest challenges for aggregates producers.

Potential uses for aggregate fines include, for example, agricultural soil enhancement additives, asphalt mix fillers and additives to existing base material production. However, in order for these fines to be marketable, they must be separated into stockpiles of very close tolerances.

In the conventional aggregates process, mined rocks and soil are reduced in size to approximately six inches or less. The reduced-size materials are then conveyed to a scalping/screening plant where all sand materials are scalped and directed to a washing tower and blending plant.

After washing the fines, the materials are typically blended into asphalt, plaster or concrete sand products.

For many years, the most common method for removing and disposing of fines has been decantation in large retention ponds. According to this method, a stream containing fines is moved hydraulically to a large retention pond. As the stream enters the pond, flow velocity is dropped and particulate matter settles in the ponds. A polymer settling agent (i.e., a flocculating agent) is added to the material in the pond to aid in the settling of all material including even the finest of particles. After a period of time, the retention pond is taken out of service and the water in the pond is allowed to evaporate, leaving behind a residue of partially dried fines. The retention pond then must be cleaned out using either a dredge or excavating equipment, such as a dragline. Finally, the dredged, partially dried fines must be hauled to a disposal area by trucks with watertight payload bodies.

The processes using retention ponds in this manner suffer many disadvantages. For example, the process requires environmental permits and is time consuming, non-productive and costly. In addition to the high cost of building and maintaining a retention pond, many aggregate plants cannot afford the machinery required for the removal of the fines once the water in the retention pond is allowed to evaporate. In addition, the water lost during evaporation of the retention ponds is expensive and scarce in some regions. Furthermore, the partially dried fines are considered a waste product due to their highly non-uniform particle size, and therefore cannot be sold. In addition, while some facilities have sufficient space to store the disposed material indefinitely, other facilities are restricted in area and/or by environmental considerations. For example, storage areas may impinge on mining activities and/or real-estate development.

Recently, companies have expanded their fines treatment processes to include equipment traditionally used in other industries, such as screw washers, classifying tanks, dewatering machines, hydraulic centrifugal separators (hydrocyclones) and filter presses. For example processes are disclosed in Prokopy, *Markets, Cost Savings Created Using By-Product Fines* and in Aggregate Views, *A fine solution: Dewatering process creates cost savings, markets for by-products*, which include, in series, a sand screw, hydrocyclones and a dewatering medium, i.e., a high-frequency screen, for treating a fines stream on its way to a retention pond. Very fine materials are thereby separated from scrubber water in transit to settling ponds. However, this process does not replace the need for settling ponds or solve the problems associated therewith, but only reduces the number of times which dredging must be performed.

Grant, *Owl Rock says goodbye to slurry holding ponds*, Pit & Quarry, September 1993, discloses a process which eliminates retention ponds, in which a sand screw is in series with a 200-foot radius thickener and multiple belt presses. According to the Grant process, slurry originating from a washing tower and sand blending plant is directed through a pipe to a thickener facility. At the thickener, the slurry is treated with an anionic polymer flocculent, and the flocculated solids are amassed at the middle of the thickener. Clarified water from the thickener flows over the thickener's weir to a nearby holding pond for recycling. The slurry, which includes 7% by weight solids before the thickening process, has a solids content of 22 to 24% by weight after the thickener. This slurry is pumped to three 3-meter wide belt filter presses. Average production rate is 90–100 st (short tons) of solids per hour based on the 22–24% solids slurry being water-reduced in the belt filter presses to a dry cake containing 75% solids. The material is classified as a fine-grained silt, group CL, by the United Soil Classification System. Tests on the material show that 74% of the material passes a No. 270 sieve and 71% passing a No. 325 sieve. Use of the disclosed configuration was found to increase the water recapturing rate, since the elimination of settling ponds reduces wash-water loss caused by evaporation.

Another system which eliminates the use of water retention ponds is disclosed in the Phoenix Process Equipment Co. product catalogue (1991). In this process, either a classifying cyclone or a sand screw is used in series with a thickener/clarifier and a belt filter press. The inlet stream to the thickener/clarifier from the classifying cyclone or sand screw contains 5.0 to 7.0% by weight solids. This solids content is increased to 25.0 to 30.0% by weight as measured in the thickener/clarifier underflow, while the thickener/clarifier overflow water contains 50 ppm TSS (total suspended solids). The solids content of the dewatered cake generated by the belt press is 70.0 to 75.0% by weight.

In the above-discussed fines treatment processes, the equipment can be extremely costly to run as a result of the tremendous amounts of water and chemicals required. Water constitutes a waste product in many of the prior art processes, and the disposal thereof can be very costly. Moreover, the equipment size and chemical treatment consumption called for by the above processes can be excessively large, resulting in high capital costs and large areas required for use thereof. For example, prior art processes require very large thickening tanks as well as multiple filter presses, which are costly. In addition, because of the relative non-homogeneity in the recovered particles, sale thereof as a useful product is difficult.

SUMMARY OF THE INVENTION

To meet the above described long-felt need in the aggregates industry and to overcome the disadvantages of the prior art, it is an object of the present invention to provide a novel process for recovering aggregate fine size particles from a carrying medium. The process of the present invention quite unexpectedly and surprisingly allows for a considerable reduction in chemical usage, equipment size and capital cost when compared to known processes. Additionally, the inventive method allows for the separation and classification of fines by size in a narrower dispersion than was previously possible.

It is a further object of the present invention to provide a system for recovering aggregate fine size particles from a carrying medium, for practicing the inventive method.

According to a first aspect of the invention, a novel method for recovering aggregate fine size particles from a carrying medium is described. The method preferably includes the following steps:

(a) introducing a feed containing mineral particles, e.g. from a rock quarry, into a sand screw, which separates the particles into separate groups of a large- and a fine-particle stream;

(b) introducing the fine particle stream from the sand screw into one or more hydraulic centrifugal separators which overflow an even finer particle stream and discharge a coarse particle stream;

(c) introducing the overflow fine particle stream from the one or more hydraulic centrifugal separators into a thickening tank to precipitate material;

(d) removing precipitated material from a lower portion of the thickening tank; and (e) feeding the precipitated material from the thickening tank to a filtering unit.

A second aspect of the invention is a system for recovering aggregate fine size particles from a carrying medium. The system preferably includes:

(a) a sand screw;

(b) one or more hydraulic centrifugal separators;

(c) a thickening tank; and (d) a filtering unit.

The sand screw, the hydraulic centrifugal separator, the thickening tank and the filtering unit are disposed in series.

Other objects and aspects of the present invention will become apparent to one of ordinary skill in the art upon review of the specification, drawings and claims appended hereto.

DETAILED DESCRIPTION OF THE PREFERRED EMBODIMENTS OF THE INVENTION

Figure 1:
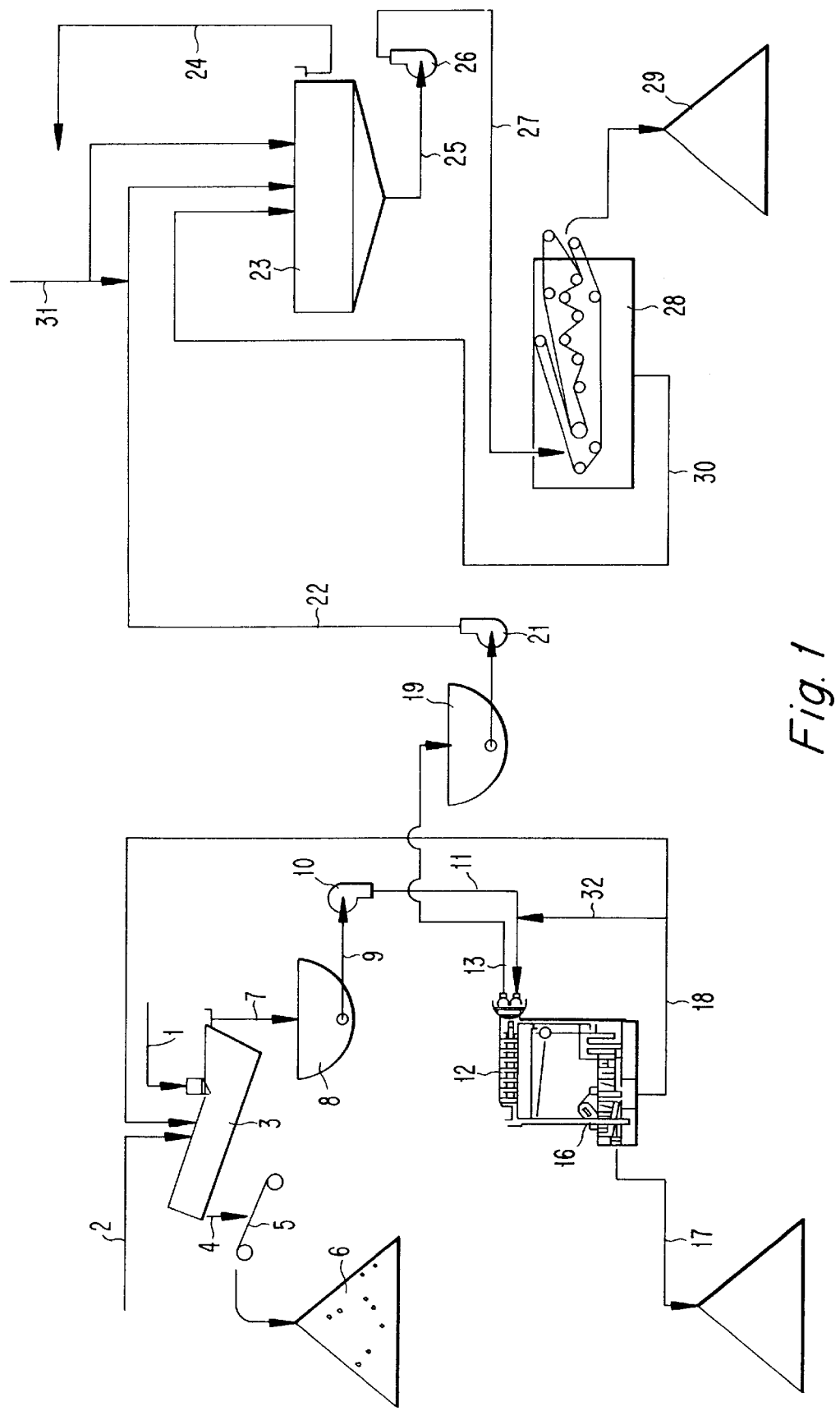
FIG. 1 illustrates a process flow for recovering aggregate fine size particles from a carrying medium according to the present invention.

The method for recovering mineral aggregate fine size particles from a carrying medium includes the following steps:

(a) introducing a feed containing particles into a sand screw, which separates the particles into separate groups of a large and a fine particle stream;

(b) introducing the fine particle stream from the sand screw into one or more hydraulic centrifugal separators which overflow an even finer particle stream and discharge a coarse particle stream;

(c) introducing the overflow fine particle stream from the one or more hydraulic centrifugal separators into a thickening tank to precipitate material;

(d) removing precipitated material from a lower portion of the thickening tank; and (e) feeding the precipitated material from the thickening tank to a filtering unit.

A second aspect of the invention is a system for recovering aggregate fine size particles which includes a sand screw, one or more hydraulic centrifugal separators, a thickening tank and a filtering unit. The sand screw, the hydraulic centrifugal separator, the thickening tank and the filtering unit are disposed in series.

As used herein, the term "aggregate" refers to a mixture of particulates such as sand, gravel or crushed stone used in, e.g., Portland cement formulations, road-building and paving compositions.

Also, as used herein, the term "fine" or "fines" refers to any particulate material that can pass through a 200-mesh screen. The sieve scale referred to herein is the Tyler Standard sieve scale.

Also, as used herein, the term "large" in reference to particulates refers to any particulate material that cannot pass through a 200-mesh screen.

Also, as used herein, the term "coarse" refers to any particulate material which can pass through 200 to 400-mesh screens.

The method and system of the present invention are particularly well suited for overcoming the problems associated with the removal and disposal of fines in the aggregates industry. A method and system for recovering aggregate fine size particles from a carrying medium according to the present invention will now be described with reference to FIG. 1, which illustrates a process flow for the inventive process.

The aggregates process begins with the mining of rock such as, e.g., granite, limestone, sandstone and igneous. The mined rock is first reduced in size to, for example, 6 inches or less. The larger sized mined materials are stockpiled, and as needed, these materials are sent directly to a crushing and screening plant for producing gravels and crushed materials. Smaller particles having a size of, for example, ⅜ inches or smaller are fed to the process of the present invention for separation and recovery of fine size particles. According to the inventive method, the feed 1, which can be either a dry feed or a feed from a wash screen, is introduced with make-up water 2 to a sand screw 3. The sand screw separates the fine particles from large particles in the feed. The large particles 4 are conveyed mechanically from the separating device 5 to a large particle storage area 6, while finer particles are transported hydraulically as a fines stream 7.

The fines stream 7 from the sand screw 3 is next introduced to one or more hydraulic centrifugal separators 12 (only one shown), via sump tank 8 and slurry pump 10. The hydraulic centrifugal separators 12 overflow an even finer stream 13 and a coarse slurry. The coarse slurry from the hydraulic centrifugal separators is preferably sent to a high frequency vibrating screen deck 16, which removes coarse solids 17 from the slurry. The water from the slurry, together with any fine particles not captured by the hydraulic centrifugal separators 12 nor trapped in the coarser discharge separated by the screen falls through the openings in the screen deck. The water and the fines on the screen deck can then be recycled either to the sand screw 3 as a feed stream 18, or to the to the hydraulic centrifugal separator feed-stream 11 as stream 32.

The overflow stream 13 from the hydraulic centrifugal separator is delivered to a thickening tank 23 via sump tank 19, slurry pump 21 and thickening tank feed 22. The thickening tank overflow 24 contains clear and reusable water which can be returned to the plant water supply stream. A portion of the overflow may also be used for the belt press 28 wash water.

The underflow 25 from the thickener, containing a slurry of increased solids content compared with that of the thickening tank feed 22, is pumped to the inlet of a filtering unit 28 such as a belt filter press, via slurry pump 26 and filter feed 27. The filtering unit 28 dewaters the slurry to a stackable cake 29. The filtrate and wash water 30 from the filtering unit can be returned to the thickening tank 23, which is sized to handle this additional flow.

The present invention is described hereinbelow with reference to the preferred embodiments thereof.

The feed 1 preferably includes particles having sizes in the range of from about $3/8$ inch, and more preferably from about $3/16$ inch, down to the finest dust. The solids in feed 1 are preferably delivered to the sand screw at a rate of about 50 to 500 TPH. The make-up water 2 is fed to the sand screw 3 at a flow rate of preferably about 800 to 1300 GPM to provide a solids content within the sand screw 3 of preferably about 25 to 30% by weight.

In the sand screw 3, the particles from feed 1 are separated by size with the rising water current in the sand screw 3. The size of the large particles 4 which are mechanically conveyed from the sand screw 3 preferably have sizes ranging from the largest particles fed to the separating device, e.g., $3/8$ inch or $3/16$, down to about 200-mesh.

The particles in fines stream 7 preferably have sizes in the range of from about 200-mesh down. The fines stream flow rate is preferably about 700 to 1100 GPM, and has a solids content of about 7 to 12% by weight, and a mass flow of preferably about 17 to 25 TPH solids.

It should be noted that careful selection of the piping used in transporting the fines streams throughout the system is necessary in order to maintain proper flow rates, thereby avoiding settling and clogging of the equipment. Furthermore, the pumps used in the system for moving the fine streams through the system should be specifically sized for these flows.

In the hydraulic centrifugal separators 12, coarse particulates move to the walls of the separators and are discharged as a coarse stream. Overflow stream 13 is reduced in fines compared to stream 11 from the sand screw 3. Suitable hydraulic centrifugal separators are commercially available, such as those manufactured by Derrick Corporation, under the tradename Hydrocyclone. Separators 12 can be constructed of polyurethane, and are preferably 3 to 5 inches in diameter, and more preferably 4 inches in diameter. One or more banks of separators 12 can be employed, with each bank comprising 10 to 20 separators. The fines in the overflow fines stream 13 are preferably in the range of about 400-mesh down, while the particles in the coarse slurry are preferably in the range of about 200-mesh down to about 400-mesh. The overflow fines stream 13 has a flow rate of preferably about 650 to 1000 GPM, a solids content of preferably about 3 to 4% by weight and a mass flow of preferably about 10 to 15 TPH solids.

The coarse slurry is preferably transported along a high frequency vibrating screen deck 16 by screen vibrations which impart a high particle acceleration thereto. This movement separates the water from the solids such that the solids migrate off the end of the screen. Such high frequency vibrating screen decks are commonly referred to as "high G" or "hi-G-dryers." The hydraulic centrifugal separators and high G dryers can be purchased as a single unit.

A preferred screen is in the range of preferably about four feet by ten feet, and the solids removed by the screen preferably are in the range of about 200-mesh down to about 400-mesh. The frequency of the vibrating screen deck is preferably in the range of from about 3000 to 4000 rpm, and more preferably in the range of from about 3500 to 3700 rpm, and most preferably about 3600 rpm.

The flow rate of the coarse slurry stream from the separators 12 is preferably about 100 to 200 GPM, with a solids content of about 50–60% by weight and a mass flow of preferably about 10 to 15 TPH solids. The mass flow rate of the coarse product removed by the screen is in the range of from preferably about 8 to 13 TPH solids. The screen recycle 18 is preferably about 8 to 13 GPM, with a solids content of preferably about 3 to 4% by weight.

At the thickening tank 23, the fines introduced thereto are clarified and thickened. The feed stream enters a deaeration tank and allows enough time for entrained air to be removed. A polymeric flocculent is added to the feed stream at various points in the feed pipe, and the retention time of the material in the thickening tank 23 is such as to allow the flocculating chemicals to bond with the suspended fines. Adsorption of the polymer is generally rapid and irreversible, so it is important that the polymer be well distributed throughout the slurry. The material in the thickening tank 23 can be constantly stirred or otherwise agitated mildly.

Fines are precipitated and particle size increased, thereby causing particles to descend to the bottom of the thickening tank, moving rapidly into compression. As this precipitated material moves to the bottom of the thickening tank, water flows over weirs on the thickening tank as overflow 24. This water can be recycled to other components of the system requiring water, such as the washing screens, sand screw and filter press and/or it for other purposes requiring clear and reusable water.

The thickening tank 23 is preferably constructed of steel, and is preferably about 40 feet or less in diameter, with a total side depth of about 14 feet. One example of a suitable thickening tank is manufactured by Phoenix Process Equipment Co., as the model HF-30F Thickener.

To ensure accurate and repeatable process control, careful selection of instrumentation such as, e.g., chemical dosing devices is important. Suitable polymer preparation and feed systems which allow precise control of dosing rate, dilution level and dwell time are manufactured by Stranco, Inc., under the name PolyBlend™.

Suitable polymers (flocculants) for use in the process include,e.g., Cationic Nalco 8852 or Calloway Cationic Coagulant. The polymer feed is preferably added to the incoming stream 22 of the thickening tank via flocculent feed stream 31 in a near form at about 20:1 dilution, at a total flow rate of about 2 to 3 GPM. The polymer feed can optionally be added directly to the thickening tank. The slurry fed to the thickening tank 23 is thickened to an underflow 25 concentration of preferably about 28–30% by weight. Thickener underflow has a flow rate of preferably about 250 to 300 GPM and a mass flow of about 20 to 30 TPH solids. The water in thickening tank overflow 24 contains less than about 150 NTU (Neffler Turbidity Units) suspended solids, and can be returned to the plant water supply stream. A portion of the overflow may also be used for the belt filter press wash water.

The underflow slurry from the thickening tank 23 is next fed to a filtering unit 28, which dewaters the solids in the thickening tank underflow stream into a dry cake which can be easily conveyed and stockpiled. While not limited thereto, exemplary types of filtering units which can be used are belt filter presses and non-belt filter presses. Because of cost considerations, the belt filter press is preferred.

The feed to the filter is preferably controlled by a nuclear density gauge which can be disposed between the underflow outlet of the thickening tank 23 and the filtering unit. In such gauges, radiation, e.g., gamma radiation, can be used to measure the density of material inside a pipe or process vessel. The absorption of gamma radiation is a function of the density of the material flowing through the pipe. The radiation source is mounted on one side of the pipe or vessel and the detector on the other side with appropriate radiation shielding surrounding the installation. This detector can be an ionization gauge, wherein the transmitted energy ionizes gas molecules in the detector, producing a current which is inversely related to the density of the material inside the pipe. Suitable nuclear density gauges are commercially available, such as the TN Technologies, Inc. Model SGD Digital Nuclear Density Gauge.

The feed to the belt filter press can be preconditioned by adding polymers (flocculants) to the slurry prior to dewatering. The addition of these flocculants results in the agglomeration of solids, thereby increasing the free water. Preferably, an inline mixer is provided for proper dispersion of the polymers into the feed.

With reference to a belt filter press as the filtering unit, the slurry is fed to a specially designed head box in the belt filter press, where the solids are equally distributed over the filtering area. The filter is a screen belt, continuously moving in one direction. Clarified water, i.e., the filtrate, passes through the filter by gravity, and is collected in a gravity drainage collecting pan. The filter automatically end-dumps the wet solids onto a second screen belt filter moving in the opposite direction. Drained solids on the filter bed leave the gravity drainage zone and are fed into the adjustable wedge compression zone. The distance between the two filters becomes less, i.e., the filters converge, as the solids advance with the moving filters. This converging puts gradual pressure on the wet solids, thus squeezing out moisture and forming a cake. With the cake sandwiched between the two filter screens, it is directed through a series of compression rollers for squeezing out more moisture. The "dry" cake is continually scraped off the screen automatically, and is then directed by a conveyor to the solids holding area.

The belt press is preferably an approximately 3 meter press. A suitable belt filter press is manufactured by Phoenix Process Equipment Co. as model WX-3.0C. Preferably, a single belt press is utilized to handle all of the solids. However, the number of presses depends on other factors, such as the initial feed volume to the process.

Preferred preconditioning polymers (flocculants) include Anionic Nalco 9901 or Callaway Anionic Emulsion. The preconditioning polymer is preferably added to the incoming stream 27 to the belt filter press at a rate of 5 to 10 GPM. The product in the filter cake on the belt filter press is preferably in the range from about 400-mesh down to zero, and is dewatered to about 65% solids by weight, at a flow rate of about 100 GPM and a mass flow of about 15 to 25 TPH solids. The filtrate 30 is recycled at a flow rate of about 200 to 400 GPM, and has a solids content of about 600 ppm. While the typical gradation of particles is in the filter cake depends in part on the initial feed to the system, preferably, approximately 80 to 88% of the material in the filter cake passes a No. 270 sieve, and approximately 65 to 70% passes a No. 325 sieve.

As a result of the inventive process, a considerable reduction in equipment size and capital cost is possible. For example, a considerable reduction in the size of thickener as well as a reduction in the number of filtering units can be realized. Because of the relatively high cost of the larger thickening tank and belt filter presses, use of hydraulic centrifugal separators can result in a substantial economic savings.

While the invention has been described in detail with reference to specific embodiments thereof, it will be apparent to persons skilled in the art that various changes and modifications can be made, and equivalents employed, without departing from the scope of the appended claims.

What is claimed is:

1. A method for recovering aggregate fine size particles from a carrying medium, comprising the steps of:
   (a) introducing a feed containing particles to a sand screw, and separating the particles into separate groups of large and fine particles, the fine particles being present in a fine particle stream;
   (b) introducing the fine particle stream from the sand screw to one or more hydraulic centrifugal separators which overflow a fine particle stream and discharge a coarse particle stream;
   (c) introducing the overflow fine particle stream from the one or more hydraulic centrifugal separators to a thickening tank and removing precipitated material as an underflow stream from a lower portion of the thickening tank; and
   (d) introducing the underflow stream from the thickening tank directly to a filtering unit, optionally with addition of a flocculant to the underflow stream.

2. The method for recovering aggregate fine size particles according to claim 1, wherein the particles are granite, limestone, sandstone, or igneous rock.

3. The method for recovering aggregate fine size particles according to claim 1, wherein the carrying medium comprises water.

4. The method for recovering aggregate fine size particles according to claim 1, wherein the feed to the sand screw comprises particles having sizes of about ⅜ inch or less.

5. The method for recovering aggregate fine size particles according to claim 1, wherein the hydraulic centrifugal separator overflowing fine stream comprises water and fines having sizes in the range of about 400-mesh and smaller, said centrifugal separator overflowing fine stream being essentially free of particles having a size of larger than 400-mesh.

6. The method for recovering aggregate fine size particles according to claim 5, wherein the hydraulic centrifugal separator coarse stream comprises water and particles having an average particle size of about 200-mesh to about 400-mesh.

7. The method for recovering aggregate fine size particles according to claim 1, further comprising introducing the coarse stream from the one or more hydraulic centrifugal separators on to a high frequency vibrating screen deck in communication with the hydraulic centrifugal separator.

8. The method for recovering aggregate fine size particles according to claim 7, further comprising recycling to the one or more hydraulic centrifugal separators any fines and water passing through openings in the screen deck.

9. The method for recovering aggregate fine size particles according to claim 1, further comprising adding flocculation chemicals to the fine particle stream from the one or more hydraulic centrifugal separators either prior to or after introduction into the thickening tank.

10. The method for recovering aggregate fine size particles according to claim 1, further comprising stirring the material in the thickening tank.

11. The method for recovering aggregate fine size particles according to claim 1, further comprising removing water from an upper portion of the thickening tank as an overflow stream.

12. The method for recovering aggregate fine size particles according to claim 1, wherein a filter cake is formed at the filtering unit which consists essentially of fines having sizes in the range of about 400-mesh and smaller.

13. The method for recovering aggregate fine size particles according to claim 1, further comprising recycling the filtrate from the filtering unit into the thickening tank.

14. The method for recovering aggregate fine size particles according to claim 1, wherein the fine particle stream from the sand screw comprises water and particles having a particle size of about 200-mesh and smaller, the stream being essentially free of particles having a size of larger than 200-mesh, and wherein the filtering unit removes particles having a particle size of about 400-mesh and smaller, the removed particles being essentially free of particles having a size of larger than 400-mesh.

15. The method for recovering aggregate fine size particles according to claim 1, further comprising adding a flocculant to the underflow stream prior to the introducing to the filtering unit, the adding comprising dispersing the flocculant into the feed with an inline mixer.

16. The method for recovering aggregate fine size particles according to claim 1, wherein the filtering unit is a filter press.

17. The method for recovering aggregate fine size particles according to claim 1, wherein the particles in the feed to the sand screw consist essentially of aggregates.

18. A method for recovering aggregate fine size particles from a carrying medium, comprising the steps of:

(a) introducing a feed comprising water and particles having sizes of about 3/8 inch and less to a sand screw, thereby separating the particles into separate groups of large and fine particles, the fine particles being present in a fine particle stream comprising water and fines having sizes in the range of about 200-mesh and smaller, and being essentially free of particles having a size larger than 200-mesh;

(b) introducing the fine particle stream from the sand screw to one or more hydraulic centrifugal separators which overflow a fine particle stream comprising water and fines having sizes in the range of about 400-mesh and smaller, and being essentially free of particles having a size larger than 400-mesh;

(c) introducing the overflow fine particle stream from the one or more hydraulic centrifugal separators to a thickening tank, wherein clear water is removed therefrom, and precipitated material is removed as an underflow stream from a lower portion of the thickening tank; and (d) introducing the underflow stream from the thickening tank directly to a belt filter press, optionally with addition of a flocculant to the underflow stream.

19. The method for recovering aggregate fine size particles according to claim 18, wherein the particles in the feed to the sand screw consist essentially of aggregates.

* * * * *